No. 625,964. Patented May 30, 1899.
J. BUEB.
PROCESS OF EXTRACTING CYANOGEN FROM COAL GAS.
(Application filed May 19, 1898.)
(No Model.)
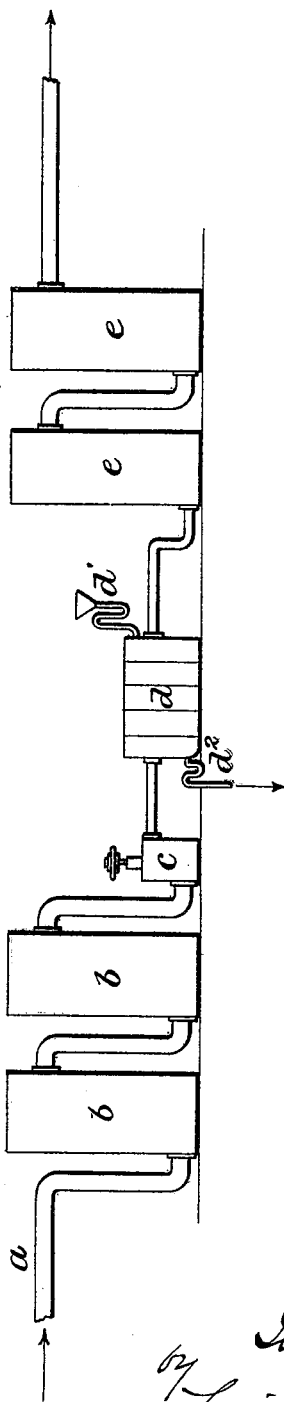

UNITED STATES PATENT OFFICE.

JULIUS BUEB, OF DESSAU, GERMANY.

PROCESS OF EXTRACTING CYANOGEN FROM COAL-GAS.

SPECIFICATION forming part of Letters Patent No. 625,964, dated May 30, 1899.

Application filed May 19, 1898. Serial No. 681,119. (No specimens.)

*To all whom it may concern:*

Be it known that I, JULIUS BUEB, a subject of the Emperor of Germany, and a resident of Dessau, Germany, have invented certain new and useful Improvements in the Extraction of Cyanogen from Coal-Gas, of which the following is a specification.

This invention relates to the extraction of cyanogen from coal-gas by reactions already known and described—for example, in the specification of Letters Patent of Great Britain No. 15,164, of 1887, and in German Letters Patent No. 41,930, granted to Oscar Knublauch—according to which cyanogen is separated from coal-gas in the form of a double salt by means of alkalies and iron. Hitherto endeavors to carry out these reactions have been directed to obtaining the salts in the form of a solution, because otherwise the purifying apparatus would become clogged, which would interfere considerably with the practical working. In dealing with the salts in the form of a solution, however, with a view to their ultimate utilization the process was not satisfactory, owing to the large quantities of liquid to be dealt with.

The object of the present invention is to overcome the aforesaid objections by conducting the process so that insoluble products are formed and separate from the gas before it passes to the ammonia-scrubbers. To effect this, there is arranged between the cooler or tar-separator and the ammonia-scrubber a chamber containing a highly-concentrated solution of an iron salt. The highly-concentrated iron-salt solution, with the assistance of the ammonia, which at this stage is present in the gas, compels the whole of the cyanogen contained in the gas to separate in the form of an insoluble precipitate. This chamber practically acts as a filter by which the insoluble salts formed are separated, so that they do not pass to the scrubbers. By using a solution of the soluble salt of iron of sufficient concentration practically all of the cyanogen present will be obtained in the precipitate.

If the soluble salt of iron be not of such concentration as to cause the whole of the cyanogen to be obtained in the precipitate, any double salt of cyanogen which may still be left in the dissolved condition may if desired be brought to the insoluble state simply by boiling and without any further addition of chemicals. The degree of concentration of the iron-salt solution employed may vary within wide limits, but should under no circumstances be so low as to yield the double salt or the main part thereof in a dissolved form. In carrying out this process in practice a solution of a concentration of from ten to twenty per cent. has given satisfactory results.

Any salt of iron may be used, but a chloride or sulphate of iron is preferable. The reaction which takes place is similar to that described in Knublauch's patents and may be illustrated by the following formula:

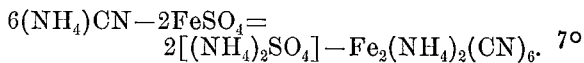
$$6(NH_4)CN - 2FeSO_4 = 2[(NH_4)_2SO_4] - Fe_2(NH_4)_2(CN)_6.$$

In the accompanying drawing I have indicated in general outline an apparatus suitable for carrying out the process.

Referring to the drawing, the gas is delivered to the pipe $a$ and passes through the coolers $b$ and thence to the tar-separator $c$, these being of any well-known construction. The cooled and tar-freed gas then passes through the vessel $d$, in which the cyanogen is precipitated in the form of an insoluble mud. This vessel is filled with a concentrated iron-salt solution, the solution being admitted through the feeding-funnel $d'$, while the precipitated mud, together with the mother-liquor, is led off by the pipe $d^2$. The gas freed from its cyanogen is then passed through the ammonia-scrubbers $e\ e$, of any well-known kind, and from thence through a pipe, which may lead to the sulphur-separators or other desired apparatus. It will thus be seen that the cyanogen is precipitated out of the gas before the latter passes through the ammonia-scrubbers and the recovery of the cyanogen is separate from that of the ammonia, although a portion of the ammonia is precipitated with the cyanogen in the form of a mud of insoluble double salt.

The ammonia which has not entered into reaction passes off with the gas into the ammonia-scrubber proper, and any chemical combination tending to the formation of mud and the clogging of the scrubbers is avoided. In practice it is preferred to employ two or more chambers or preliminary purifiers containing the iron-salt solution, so that by means of suitably-disposed valves and connecting-pipes either can, according to requirements, be connected with or disconnected from the system, and when a certain quantity of mud has settled down in one chamber such chamber can be disconnected from the system, while another chamber charged with iron-salt solution is connected therewith. The contents of the disconnected chamber after being discharged therefrom may be boiled and then the dissolved part be separated from the undissolved part and marketable ammonia-salt may be extracted from the former direct.

Although salts of iron have alone been referred to above, other metal salts may, if desired, be used; but I consider only the salts of iron to be at present of any value economically, and although I have described the use of a separate chamber for the reception of the soluble salts of iron it will be evident that the first compartment or first two or more compartments of the scrubber can be used in place of such separate chamber where the scrubber is of a nature to render this practicable—for example, the horizontal scrubbers with rotating bodies alternately dipping into liquid and presenting their wetted surfaces to the gas. In this case the first one, two, or more of the compartments will contain the soluble salts of iron in place of water. In this case care must be taken that the solution of salts of iron is kept separate from the water in the ammonia-separating part of the scrubber.

I claim—

The herein-described process of separating the cyanogen from gases of dry distillation containing ammonia in excess of cyanogen, which consists in treating such gases with a concentrated solution of a metallic salt, thereby precipitating all the cyanogen and part of the ammonia in the form of an insoluble double compound, and leaving the greater part of the ammonia with the gas.

In testimony whereof I have signed my name to this specification in the presence of two subscribing witnesses.

JULIUS BUEB.

Witnesses:
HUGO ANDREAE,
FRITZ ROESSLER.